US008155958B2

(12) United States Patent
Terao

(10) Patent No.: US 8,155,958 B2
(45) Date of Patent: Apr. 10, 2012

(54) SPEECH-TO-TEXT SYSTEM, SPEECH-TO-TEXT METHOD, AND SPEECH-TO-TEXT PROGRAM

(75) Inventor: Makoto Terao, Tokyo (JP)

(73) Assignee: NEC Corporation, Tokyo (JP)

( * ) Notice: Subject to any disclaimer, the term of this patent is extended or adjusted under 35 U.S.C. 154(b) by 1036 days.

(21) Appl. No.: 12/089,619

(22) PCT Filed: Nov. 8, 2006

(86) PCT No.: PCT/JP2006/322255
§ 371 (c)(1),
(2), (4) Date: Apr. 9, 2008

(87) PCT Pub. No.: WO2007/055233
PCT Pub. Date: May 18, 2007

(65) Prior Publication Data
US 2009/0048832 A1     Feb. 19, 2009

(30) Foreign Application Priority Data
Nov. 8, 2005   (JP) .................................. 2005-323993

(51) Int. Cl.
*G10L 15/26* (2006.01)
(52) U.S. Cl. ...................................... 704/235
(58) Field of Classification Search .................. 704/235, 704/260, 251, 257
See application file for complete search history.

(56) References Cited

U.S. PATENT DOCUMENTS

| 5,079,701 A * | 1/1992 | Kuga et al. ...................... 704/10 |
| 5,649,060 A * | 7/1997 | Ellozy et al. .................. 704/278 |
| 5,903,867 A | 5/1999 | Watari et al. |
| 6,161,093 A | 12/2000 | Watari et al. |
| 6,490,563 B2 * | 12/2002 | Hon et al. ...................... 704/260 |
| 6,535,848 B1 * | 3/2003 | Ortega et al. .................. 704/235 |
| 6,785,650 B2 * | 8/2004 | Basson et al. ................. 704/235 |
| 6,912,498 B2 * | 6/2005 | Stevens et al. ................ 704/235 |
| 6,961,700 B2 * | 11/2005 | Mitchell et al. ............... 704/235 |
| 7,881,930 B2 * | 2/2011 | Faisman et al. ............... 704/235 |
| 2001/0003826 A1 * | 6/2001 | Iwata ............................ 709/206 |
| 2003/0061031 A1 * | 3/2003 | Kida et al. ...................... 704/10 |
| 2005/0114129 A1 * | 5/2005 | Watson et al. ................ 704/235 |
| 2005/0143994 A1 * | 6/2005 | Mori et al. .................... 704/235 |
| 2005/0143998 A1 | 6/2005 | Ogawa |
| 2007/0244700 A1 * | 10/2007 | Kahn et al. .................... 704/235 |

FOREIGN PATENT DOCUMENTS

| EP | 655 696 A1 | 5/1995 |
| EP | 1 460 615 A1 | 9/2004 |
| JP | 07-093553 A | 4/1995 |
| JP | 07-152787 A | 6/1995 |
| JP | 07-210185 A | 8/1995 |
| JP | 2001-117582 | 4/2001 |
| JP | 2003-316375 A | 11/2003 |
| JP | 2004-170765 A | 6/2004 |
| JP | 2004-530205 A | 9/2004 |
| JP | 2005-1650660 A | 6/2005 |
| JP | 2005-228178 A | 8/2005 |
| WO | WO-2004/047075 A1 | 6/2004 |

* cited by examiner

*Primary Examiner* — Abul Azad
(74) *Attorney, Agent, or Firm* — Dickstein Shapiro LLP

(57) ABSTRACT

[PROBLEMS] To provide a speech-to-text system and the like capable of matching edit result text acquired by editing recognition result text or edit result text which is newly-written text information with speech data. [MEANS FOR SOLVING PROBLEMS] A speech-to-text system (1) includes a matching unit (27) which collates edit result text acquired by a text editor unit (22) with speech recognition result information having time information created by a speech recognition unit (11) to thereby match the edit result text and speech data.

19 Claims, 10 Drawing Sheets

FIG. 6
EDIT RESULT TEXT (NOTATION): JIKAINOKAIGIWANIJYUUROKUNICHINOGOZENHACHIJIKARAKAISAIITASHIMASU
EDIT RESULT TEXT (PHONEME): n i j u: r o k u n i ch i n o g o z e N h a ch i j i
RECOGNITION RESULT (PHONEME): ... n i j u: r o n i ch i n o z e N h a ch i j i ... (... nijuːroni chinozeNhachiji ···)
SPEECH DATA:
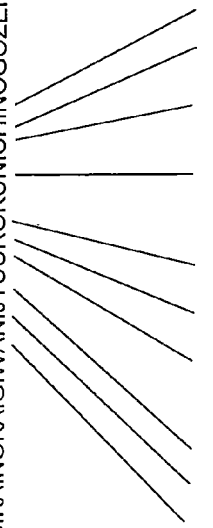
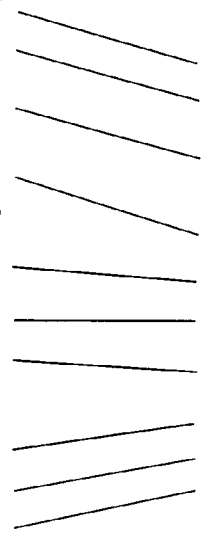
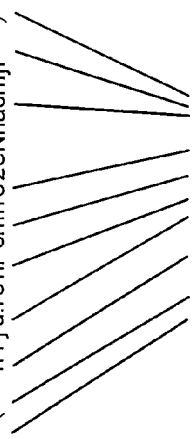

US 8,155,958 B2

SPEECH-TO-TEXT SYSTEM, SPEECH-TO-TEXT METHOD, AND SPEECH-TO-TEXT PROGRAM

This application is based upon and claims the benefit of priority from Japanese patent application No. 2005-323993, filed on Nov. 8, 2005, the disclosure of which is incorporated herein in its entirety by reference.

TECHNICAL FIELD

The present invention relates to a speech-to-text system, a speech-to-text method, and a speech-to-text program. In particular, the present invention relates to a speech-to-text system, a speech-to-text method, and a speech-to-text program, for transforming speech into text efficiently using speech recognition.

BACKGROUND ART

To prepare proceedings of meetings or lectures, speech data have to be transformed into text (hereinafter, transformation of speech into text is called "writing-out"). However, as enormous human costs are required for speech writing-out operation, improvements in operating efficiency are required. Meanwhile, with the advancement in the speech recognition technique in recent years, accuracy in speech recognition for free speech has been improved. In such situation, a support for write-out operation using the speech recognition technique has been considered.

Patent Document 1 describes an example of an existing speech-to-text system using speech recognition. The speech-to-text system described in Patent Document 1 is a system in which speech data to be written out is speech-recognized and is automatically transformed into text, and then errors in the recognition result text are edited by a human to thereby complete writing-out. As shown in FIG. 10, this conventional speech-to-text system 200 includes a speech storing unit 212, a speech recognition unit 211, a recognition result storing unit 213, an editor unit 222, an edit position storing unit 225, an edit result storing unit 226, a speech playback unit 221, a speech playback time storing unit 224, and a synchronization unit 223.

The existing speech-to-text system 200 having such a configuration operates in a following manner. The speech storing unit 212 stores speech data to be written-out. The speech recognition unit 211 reads in the speech data from the speech storing unit 212 to recognize the speech, and converts the data into recognition result text information and outputs it to the recognition result storing unit 213. In this process, link information for associating each word in the recognition result text information with a part of the speech data is also output together. The link information includes time information based on the playback time of the speech data corresponding to each word. The recognition result text information and the link information are stored in the recognition result storing unit 213. Thereby, the recognition result text information and the speech data can be matched.

The editor unit 222 reads in the recognition result text information stored in the recognition result storing unit 231, and edits errors in the recognition result text according to the edit instructions by the writing-out operator, and outputs the edited text to the edit result storing unit 226. Similar to a general text editor, the editor unit 222 positions an edit cursor on the text, the text at which the edit cursor is located is edited. The position of the edit cursor is stored in the edit position storing unit 225.

Meanwhile, the speech playback unit 221 plays back the speech data stored in the speech storing unit 22 in accordance with the speech playback instructions from the write-out operator. At this point, the time of the speech being played back is stored in the speech playback time storing unit 224. The writing-out operator proceeds editing operation of the errors in the recognition result text while listening to the speech being played back.

The synchronization unit 223 synchronizes the position of the edit cursor stored in the edit position storing unit 225 with the speech playback time stored in the speech playback time storing unit 224 in accordance with the synchronization instructions by the operator. This is realized by referring to the link information, associating the recognition result text information and the speech data, stored in the recognition result storing unit 213. That is, in the case of synchronizing the speech playback time with the position of the edit cursor, it is only necessary to match the speech playback time to the time corresponding to the recognition result word at which the edit cursor is positioned. In this way, by synchronizing the speech playback time with the position of the edit cursor, the writing-out operator can promptly listen to the speech corresponding to the position of the edit cursor and check it during the editing operation.

In contrast, in the case of synchronizing the position of the edit cursor with the speech playback time, it is also possible to move the edit cursor onto the recognition result text corresponding to the part of the speech data which is being played back. By synchronizing the position of the edit cursor with the speech playback time in this way, the writing-out operator can place the edit cursor at the position on the text corresponding to the part recognized incorrectly as soon as he/she listens to the speech which is recognized incorrectly.

As described above, in the conventional speech-to-text system, as it is possible to synchronize the position of the edit cursor placed on the recognition result text with the speech playback time each other by using correspondence between the recognition result text and the speech data, efficiency of the writing operation is improved.

Patent Document 1: JP Patent Laid-Open Publication No. 2004-530205

DISCLOSURE OF THE INVENTION

Problem to be Solved by the Invention

The existing speech-to-text system involves a problem that the edited text and the speech data cannot be matched if the recognition result text has been edited or text is newly edited without using the recognition result text. This is because no detailed time information is given to the edited parts after the text has been edited.

Hereinafter, the case where recognition result text is edited will be described using a specific example.

Description will be given for the case where speech data "jikainokaigiwanijuurokunichi-nogozenhachijikarakaisaiitashima su" is recognized as "jikai" "no" "kaigi" "wa" "nijyuu" "ro" "ni" "chi" "no" "zen" "hachi" "ji" "kara" "kaisai" "itashi" "masu" expressed in "kana" and "kanji" characters.

The recognition result text information is output in word units as shown with the quotation marks, and time information of speech data corresponding to each of the words such as "jikai" "no" and "kaigi" is given as link information. As such, at this point, it is possible to synchronize the speech playback time with the position of the edit cursor regardless of the edit cursor being positioned at any word, or it is possible to synchronize the edit cursor with a word corresponding to the speech part being played back regardless of the speech playback time.

However, if the portions recognized incorrectly such as "nijuu" "ro" "ni" "chi" "no" "zen" "hachi" "ji" are edited by being rewritten into "nijuurokunichinogozenhachiji" in "kana" and "kanji" characters through editing operation by the write-out operator, there is caused a problem.

To the edited part "nijuurokunichinogozenhachiji", time information is lost due to the editing operation, and as a result, no correspondence can be acquired between the edit result text and the speech data. For example, as there is no time information for "gozen" in the edited text, speech data corresponding to "gozen" cannot be found. As such, when the edit cursor is placed on "gozen", the speech playback time cannot be synchronized, or when the speech corresponding to "gozen" is played back, the edit cursor cannot be synchronized with "gozen" on the text. As described above, if the edit result text and the speech data cannot be matched, the writing-out operator cannot use a function of synchronizing the edit cursor and the speech playback time when he/she wants to recheck the edit position during the editing operation, whereby the operating efficiency will become lowered.

Although it is widely known that an operator cross-checks text which was written-out by another operator, the similar problem will be caused even in that case.

It is therefore an object of the present invention to provide a speech-to-text system and the like capable of matching edit result text information and speech data even in the case that recognition result text information is edited, or that text is newly edited without using recognition result text in writing-out the speech.

Means for Solving the Problem

A speech-to-text system according to the present invention includes a speech recognition unit which performs speech recognition of speech data and outputs recognition result information including time information of the speech data, a text editor unit which creates edit result text which is text information written-out from the speech data, and a matching unit which collates the edit result text with the recognition result information to thereby match the edit result text and the speech data.

According to the text-to-speech system, the matching unit collates the edit result text with the recognition result information to thereby match the edit result text and the speech data by associating the time information of the recognition result information with the edit result text. Thereby, information indicating the correspondence relationship between the position on the edit result text and the playback part of the speech data can be acquired.

As such, it is possible to match the edit result text having time information and the speech data in the writing-out operation of the speech.

The speech-to-text system may be configured such that the recognition result information is composed of notation characters, and the matching unit collates the edit result text with the recognition result information according to the consistency of the notation characters. With this configuration, the edit result text and the recognition result information can be collated easily as the edit result text is generally written out using notation characters.

The speech-to-text system may be configured such that the recognition result information is composed of sub-words, the system further includes a sub-word conversion unit which converts the edit result text into a sub-word string, and the matching unit collates the edit result text with the recognition result information according to the consistency of the sub-words. With this configuration, as the recognition accuracy in the sub-word units is relatively high even if the recognition accuracy in the notation characters is low in the speech recognition process, collation can be performed with higher accuracy than the case of performing collation between the edit result text and the recognition result information using the consistency of notation characters. As such, the edit result text and the speech data can be matched with high accuracy. Note that a sub-word means a basic acoustic unit such as phoneme or syllable.

In the speech-to-text system, the sub-word conversion unit may convert the edit result text into a sub-word string by morpheme analysis using a dictionary having reading information. With this configuration, even in the case that the edit result text to be converted is in a language in which text is not segmented in word units as the Japanese language, the text can be converted into a sub-word string using the reading information provided in the morpheme dictionary.

In the speech-to-text system, the text editor unit may store a "kana" character string input before "kana-to-kanji" conversion, and the sub-word conversion unit may convert the edit result text into a sub-word string by referring to the "kana" character string before "kana-to-kanji" conversion. With this configuration, as the reading information of the edit result text can be acquired from the "kana" character string, the edit result text can be converted into a sub-word string without using a morpheme dictionary.

The system may further include a speech playback unit which plays back the speech data, and a synchronization unit which synchronizes an edit cursor position of the text editor unit with speech playback time of the speech playback unit by referring to the correspondence between the edit result text and the speech data made by the matching unit. With this configuration, the playback part of the speech data and the edit cursor position can be linked, so that the operator is able to perform writing-out of the speech efficiently.

In the speech-to-text system, the synchronization unit may synchronize the edit cursor position with the speech playback time. The allows the edit cursor to move to the position on the text corresponding to the playback part of the speech data, so that the operator can check the edit result text while listening to the speech and rewrite the incorrect part rapidly.

In the speech-to-text system, the synchronization unit may synchronize the speech playback time with the edit cursor position. This enables to play back the speech data of the part corresponding to the text at the edit cursor position, so that the operator can immediately listen to the speech corresponding to the position of the edit cursor.

A speech-to-text method according to the present invention includes: a speech recognition step for performing speech recognition of speech data and outputting recognition result information including time information of the speech data, a text editing step for creating edit result text which is text information written-out from the speech data, and a matching step for collating the edit result text with the recognition result information to thereby match the edit result text and the speech data.

According to the speech-to-text method, the edit result text and the recognition result information are collated with each other in the matching step, and the edit result text and the time information of the recognition result information are associated, whereby the edit result text and the speech data are matched. As such, in the speech writing-out operation, text information prepared by editing the recognition result information or edit result text such as newly-written text information which does not include time information can be matched with the speech data. Thereby, information indicating the correspondence relationship between the position on the edit result text and the play-back part of the speech data can be acquired.

In the speech-to-text method, the recognition result information may be composed of notation characters, and in the matching step, the edit result text and the recognition result information may be collated according to the consistency of the notation characters. With this configuration, the edit result text and the recognition result information can be matched easily as the edit result text is generally written out in notation characters.

In the speech-to-text method, the recognition result information may be composed of sub-words, and the method may further include a sub-word conversion step for converting the edit result text into a sub-word string before the matching step so that the edit result text and the recognition result information are collated according to the consistency of the sub-words in the matching step. As the recognition accuracy in sub-word units such as phoneme is relatively higher than the recognition accuracy in notation characters in speech recognition in general, the speech data and the edit result text can be matched with higher accuracy in this configuration compared with the case that the edit result text and the recognition result information are collated according to the consistency of notation characters.

In the speech-to-text method, in the sub-word conversion step, the edit result text may be converted into a sub-word string by morpheme analysis using a dictionary having reading information. With this configuration, even if the edit result text to be converted is in a language in which text is not segmented in word units as the Japanese language, the text can be converted into sub-word strings using the reading information provided in the morpheme dictionary.

In the speech-to-text method, a "kana" character string input, before "kana-to-kanji" conversion, may be stored in the text editing step, and the edit result text may be converted into a sub-word string by referring to the "kana" character string before "kana-to-kanji" conversion in the sub-word conversion step. With this configuration, as reading information of the edit result text can be acquired from the "kana" character string, the edit result text can be converted into a phoneme string without using a morpheme dictionary.

In the speech-to-text method, the text editing step may include a speech playback step for playing back the speech data, and a synchronization step for synchronizing an edit cursor position with the speech playback time in the speech playback step by referring to the correspondence between the edit result text and the speech data made in the matching step. This enables to link the playback part of the speech data and the edit cursor position, whereby the operator can perform writing-out efficiently.

In the speech-to-text method, the edit cursor position may be synchronized with the speech playback time in the synchronization step. This allows the edit cursor to move to the position on the text corresponding to the playback part of the speech data, so that the operator can check the edit result text while listening to the speech and rewrite the error part promptly.

In the speech-to-text method, the speech playback time may be synchronized with the edit cursor position in the synchronization step. This enables to play back the speech data of the part corresponding to the text of the edit cursor position, so that the operator can listen to the speech corresponding to the position of the edit cursor promptly.

A speech-to-text program according to the present invention causes a computer to execute: a speech recognition process for performing speech recognition of speech data and outputting recognition result information including time information of the speech data, a text editing process for creating edit result text which is text information written-out from the speech data, and a matching process for collating the edit result text with the recognition result information to thereby match the edit result text and the speech data.

In the speech-to-text program, the recognition result information may be composed of notation characters, and the matching process may be configured to collate the edit result text with the recognition result information according to the consistency of the notation characters.

In the speech-to-text program, the recognition result information may be composed of sub-words, and the program may further cause the computer to execute a sub-word conversion process for converting the edit result text into a sub-word string so that the edit result text and the recognition result information are collated according to the consistency of the sub-words in the matching process.

In the speech-to-text program, the sub-word conversion process may be configured such that the edit result text is converted into a sub-word string by morpheme analysis using a dictionary having reading information.

In the speech-to-text program, a "kana" character string input, before "kana-to-kanji" conversion, may be stored in the text editing process so that the edit result text may be converted into a sub-word string by referring to the "kana" character string before "kana-to-kanji" conversion in the sub-word conversion process.

The speech-to-text program may further cause the computer to execute a speech playback process for playing back the speech data, and a synchronization process for synchronizing an edit cursor position in the text editing process with speech playback time in the speech playback process by referring to the correspondence between the edit result text and the speech data made in the matching process.

In the speech-to-text program, the synchronization process may be configured to synchronize the edit cursor position with the speech playback time. Alternatively, in the speech-to-text program, the synchronization process may be configured to synchronize the speech playback time with the edit cursor position.

According to the speech-to-text program as described above, the edit result text and the speech data are matched by the matching process, whereby information indicating the correspondence between the position on the edit result text and the playback part of the speech data can be acquired. As such, in the speech writing-out operation, it is possible to match edit result text and the speech data even if the text is text information prepared by editing the recognition result information or text information having no time information like newly-written text information, as the case of the speech-to-text system described above.

Effects of the Invention

According to the present invention, in a speech-to-text system, by collating edit result text having no time information with recognition result information including time information, time information can be acquired even on the edit result text. As such, in a speech writing-out operation, it is possible to match edit result text which is acquired by editing the recognition result text or edit result text which is text information newly written without using the recognition result text, with speech data.

BEST MODE FOR CARRYING OUT THE INVENTION

The configuration and operation of a speech-to-text system, which is a first exemplary embodiment of the invention, will be described in detail with reference to the drawings.

FIG. 1 is a functional block diagram of the speech-to-text system 1. Referring to FIG. 1, the speech-to-text system 1 includes a speech recognition device 10 and an editing device 20.

The speech-recognition device 10 includes a speech recognition unit 11, a speech storing unit 12, and a recognition result storing unit 13. The editing device 20 includes a text editor unit 22, an edit position storing unit 25, an edit result storing unit 26, a speech playback unit 21, a speech playback time storing unit 24, a matching unit 27, and a synchronization unit 23.

The speech storing unit 12 stores speech data which is to be transformed into text. The speech data may be data formed by sampling analog speech data with a predetermined sampling frequency and quantizing each sampling value to thereby be digitized.

The speech recognition unit 11 reads in the speech data from the speech storing unit 12 and performs speech recognition, and converts the content of the speech into text. Then, the speech recognition unit 11 outputs the recognition result text, to which time information based on the playback time of the speech data is added, to the recognition result storing unit 13 as recognition result information. The time information is information indicated by the time passed from the reference point (e.g., head of the data) in the speech data, the number of passed frames, or the like.

The text editor unit 22 is a text editor for editing text information. The text editor unit 22 reads in recognition result text from the recognition result storing unit 13, and edits the recognition result text in accordance with editing instructions from the writing-out operator. With the editing operation, errors in the speech recognition are corrected, such that text information written-out from the speech data is finally created. The edit result storing unit 26 stores the text information edited by the text editor unit 22 as edit result text. The edit position storing unit 25 stores the position of the edit cursor on the text editor.

The speech playback unit 21 plays back speech data stored in the speech storing unit 12 in accordance with the speech playback instructions from the writing-out operator. The speech playback time storing unit 24 regularly stores the time of the speech part played back by the speech playback unit 21.

The matching unit 27 collates the edit result text stored in the edit result storing unit 26 with the recognition result information having the time information stored in the recognition result storing unit 13 to thereby match the edit result text with the speech data. Thereby, the time information can be matched with the edited part in which the time information is lost in the edit result text. In the first exemplary embodiment, collation between the edit result text and the recognition result information is performed in notation character units.

The synchronization unit 23 refers to the result of the correspondence between the edit result text and the speech data made by the matching unit 27 to thereby synchronize the cursor position stored in the edit position storing unit 25 with the speech playback time stored in the speech playback time storing unit 24, in accordance with the synchronizing instructions from the operator.

Each of the speech storing unit 12, the recognition result storing unit 13, the speech playback time storing unit 24, the edit position storing unit 25, and the edit result storing unit 26 is composed of a storage device such as a magnetic disk device, a semiconductor memory, or the like.

Next, the overall operation of the speech-to-text system 1 will be described in detail with reference to the flowcharts shown in FIGS. 1 and 2.

The speech recognition unit 11 reads in speech data stored in the speech storing unit 12 and performs speech recognition, and outputs the recognition result text, to which time information for associating with the speech data is added, to the recognition result storing unit 13 as recognition result information (S101 in FIG. 2).

For instance, if the notation characters in the speech recognition result text are "jikainokaigiwanijuuronichi-nozenhachijikarakaisaiitashimasu" in "kana" and "kanji" characters, time information including that "jikai" corresponds to the time 0.1 to 0.4 second in the speech data and that "no" corresponds to the time 0.4 to 0.5 second in the speech data is output together with the speech recognition result text (see correspondence between the recognition result and the speech data in FIG. 3).

The speech recognition process by the speech recognition unit 11 is realized by a general large vocabulary continuous speech recognition technique in which MFCC (Mel-scale Frequency Cepstral Coefficients) is used as the feature amount, a Hidden Markov Model is used as an acoustic model, and a word N-gram model is used as a language model.

The text editor unit 22 is a text editor to be used by a writing-out operator for transforming speech into text, with which text at the edit cursor position displayed on the display screen or the like is edited. That is, the text at the edit cursor position is overwritten by keyboard input or the like by the operator and edited (S102 in FIG. 2). In this process, the characters corresponding to the edit cursor position is displayed by being highlighted, underlined or indicated with lines provided beside the characters, such that the writing-out operator can check the edit cursor position. Further, the edit cursor position on the text is stored in the edit position storing unit 25. The text information edited by the text editor unit 22 is stored in the edit result storing unit 26.

Note that although in the exemplary embodiment it is assumed that the text editor unit 22 reads in the text information which is the recognition result stored in the recognition result storing unit 13 before starting editing and then edits errors in the recognition result, it is also possible to write a new text from a state where no text is present, without reading the recognition result.

The speech playback unit 21 plays back the speech data to be written-out stored in the speech storing unit 12, and outputs the speech from an output device such as a speaker, in accordance with the speech playback instructions by an input from a keyboard or the like by the writing-out operator. By outputting the speech from an output device such as a speaker, the writing-out operator can listen to the speech to perform writing-out. In this process, the time of the speech being played back is stored in the speech playback time storing unit 24. If the speech playback time stored in the speech playback time storing unit 24 is overwritten by the synchronization unit 23 described below, the speech playback unit 21 plays back the speech of the newly written time.

The synchronization unit 23 determines whether there is a synchronization instruction from the writing-out operator (S103 in FIG. 2), and if there is a synchronization instruction, performs a synchronization process for synchronizing the edit cursor position stored in the edit position storing unit 25 with the speech playback time stored in the speech playback time storing unit 24. This synchronization process includes two types of synchronizations, namely, the case that the speech playback time is synchronized with the edit cursor position, and the case that the edit cursor position is synchronized with the speech playback time. In other words, the former synchronization process enables to play back the speech data corresponding to the text at the cursor position, and the latter synchronization process allows the edit cursor to move to the position on the text corresponding to the location where the speech is being played back.

When the synchronization unit 23 is given with a synchronization instruction (yes in S103 of FIG. 2), first, the matching unit 27 collates the edit result text stored in the edit result storing unit 26 with the recognition result information stored in the recognition result storing unit 13 (S104 in FIG. 2) to thereby match the edit result text and the speech data (S105 in FIG. 2).

The operation of the matching unit 27 to match the edit result text and the speech data will be described in detail by using a specific example.

Description will be given exemplary for the case where speech data "jikainokaigiwanijuurokunichi-nogozenhachijikarakaisaiitashima su" is recognized as "jikainokaigiwanijuuronichi-nozenhachijikarakaisaiitashimasu" and then the writing-out operator edits the part "nijuuronichinozenhachiji", which is recognized incorrectly, to "nijuurokunichinogozenhachiji" in "kana" and "kanji" characters.

FIG. 3 shows the operation of the matching unit 27 in the above-mentioned example.

The matching unit 27 collates the edit result text expressed in the notation characters, that is, "kana" and "kanji" characters, of "jikainokaigiwaniju:rokunichinogozenhachijikara-kaisaiitashima su" and the notation characters, that is, "kana" and "kanji" characters, of "jikainokaigiwanijuuronichi-nozenhachijikarakaisaiitashimasu" in the recognition result information, as shown in FIG. 3 (S104 in FIG. 2). This collation can be realized by performing matching in notation character units using Dynamic Programming (DP) which is a well-known technique. In other words, the both are correlated using the notation characters "ni", "no", and "hachi" which are commonly used in both of the notation characters "nijuurokunichinogozenhachiji" in the edit result text and the notation characters "nijuuronichinozenhachiji" in the recognition result information.

As described above, when the correspondence between the notation characters of the edit result text and the recognition result information is acquired, the edit result text and the speech data can be matched, because the notation characters of the recognition result information accompanies time information (S105 in FIG. 2). For instance, in FIG. 3, if it is understood that the position P1 on the edit result text corresponds to the position P2 of the recognition result information, as P2 corresponds to the time t3 of the speech data, the position P1 on the edit result text can be corresponded to the time t3 on the speech data.

By referring to the correspondence between the edit result text and the speech data by the matching unit 27, the synchronization unit 23 synchronizes the speech playback time stored in the speech playback time storing unit 24 with the edit cursor position stored in the edit position storing unit 25, or synchronizes the edit cursor position stored in the edit position storing unit 25 with the speech playback time stored in the speech playback time storing unit 24 (step S106 in FIG. 2).

In other words, in FIG. 3, when the edit cursor position is P1, the speech playback time is changed to t3, or when the speech playback time is t3, the edit cursor position is changed to P1.

The editing of the text (S102 in FIG. 2), matching of the edit result text and the speech data (S104 and S105 in FIG. 2), and synchronization process between the edit cursor position and the speech playback time (S106 in FIG. 2), as described above, are repeated until editing of the text is completed (S107 in FIG. 2). When the writing-out is completed through repetitious text editing, the entire processing ends.

Although, in the above description, matching process (S104 and S105 in FIG. 2) between the edit result text and the speech data by the matching unit 27 is performed when the operator gives synchronization instructions, it is also acceptable to perform the matching process at any time when the text information is edited. Namely, S104 and S105 may be performed between S102 and S103 in FIG. 2. In that case, when synchronization instructions are given, synchronization process (S106 in FIG. 2) between the speech playback time and the edit cursor position by the synchronization unit 23 will be performed immediately.

Next, effects of the exemplary embodiment will be described.

In the speech-to-text system 1, the matching unit 27 matches the edit result text, to which no time information is given, with the recognition result information to which time information is given, whereby the edit result text acquired as a result of editing of the recognition result text or the recognition result text which is text information written from the beginning without using the recognition result text can be matched with the speech data. Thereby, the operator can use the synchronization function between the edit cursor position and the speech playback time at any time regardless of whether or not the editing operation having been carried out. This improves the efficiency of the writing-out operation significantly.

Next, the configuration and operation of a speech-to-text system 2, which is a second exemplary embodiment of the invention, will be described in detail with reference to the drawings.

FIG. 4 is a functional block diagram of the speech-to-text system 2. The speech-to-text system 2 in FIG. 4 is different from the speech-to-text 1 of the first exemplary embodiment shown in FIG. 1 in that when a matching unit 30 collates the edit result text with the recognition result information, collation is performed using consistency of sub words, although the matching unit 27 uses consistency of notation characters in the first exemplary embodiment, and a speech recognition unit 11a in FIG. 4 outputs a sub-word string with time information as recognition result information in addition to the notation characters, and the recognition result storing unit 13 stores a sub-word string having time information as recognition result information in addition to the notation characters.

As shown in FIG. 5, the matching unit 30 of the second exemplary embodiment includes a sub-word conversion unit 31 and a sub-word matching unit 32. The second exemplary embodiment is characterized in that the matching unit 30 matches the edit result text and recognition result information according to the consistency of sub-words. Note that a sub-word means a basic acoustic unit such as phoneme or syllable.

Although a phoneme is adopted as a sub-word in the second exemplary embodiment, the configuration is the same even if another basic acoustic unit such as syllable is used.

Next, operation of the matching unit 30 will be described in detail by way of a specific example.

Description will be given for the case of editing a speech recognition result of "jikainokaigiwanijuuronichinozenhachijikarakaisaiitashimasu" to "jikainokaigiwanijuurokunichinogozenhachijikarakaisaiitashima su". In addition to the notation characters, the speech recognition unit 11a also outputs a phoneme string of "jikainokaigiwaniju:ronichinozenhachijikarakaisaiitashimasu" as the recognition result information. At this time, time information of the corresponding speech data is added to the phoneme string. The recognition result storing unit 13 stores the phoneme string having time information as recognition result information in addition to the notation characters.

As the speech recognition unit 11a performs speech recognition processing in units of phoneme or syllable, it is possible to output the recognition result as a phoneme string.

The sub-word conversion unit 31 converts the edit result text composed of notation characters into a sub-word string. As a phoneme is adopted as a sub-word in the second exemplary embodiment, the edit result text is converted into a phoneme string. Namely, the text information of "jikainokaigiwanijuurokunichinogozenhachijikarakaisaiitashima su", in "kana" and "kanji" characters, is converted into a phoneme string of "jikainokaigiwaniju:rokunichinogozenhachijikarakaisaiitashima su".

The sub-word matching unit 32 collates the phoneme string of the edit result text converted by the sub-word conversion unit 31 with the phoneme string of the recognition result information stored in the recognition result storing unit 13. FIG. 6 shows this state. By collating and matching the phonemes, more accurate correspondence with few errors can be realized, compared with correspondence according to notation characters. This is because in speech recognition generally, even though the notation characters are recognized incorrectly, sub-words such as phonemes are likely to be correct.

For example, in the example of FIG. 6, the notation character level, "ju" in one "kanji" character is incorrectly recognized as another "kanji" character, and "ji" in one "kanji" character is incorrectly recognized as another "kanji" character. Although these are not matched in the consistency of notation characters, it is understood that they are matched correctly when being collated in phonemes. For matching the phoneme strings, a well-known method such as DP matching may be used.

Next, a method of converting the edit result text into a sub-word string by the sub-word conversion unit 31 will be described.

If the language to be written is a language which is segmented in word units like English, the edit result text can be converted into a sub-word string by referring to a word dictionary in which phonetic symbols are given. However, if the language to be written is a language which is not segmented in word units like Japanese, the edit result text cannot be converted into a sub-word string directly.

Hereinafter, a method of converting an edit result text into a sub-word string in the case that the writing-out object is in the Japanese language will be described.

FIG. 7 is a block diagram showing an example of the sub-word conversion unit 31 which converts edit result text in the Japanese language into a sub-word string. The sub-word conversion unit 31 shown in FIG. 7 includes a morpheme analysis unit 33 and a reading information-equipped morpheme analysis dictionary storing unit 34.

The morpheme analysis unit 33 performs well-known morpheme analysis on the edit result text "jikainokaigiwaniju:rokunichinogozenhachijikarakaisaiitashima su" input from the edit result storing unit 26. In this process, as the morpheme analysis unit 33 performs morpheme analysis while referring to the reading information-equipped morpheme analysis dictionary storing unit 34, the reading information of the edit result text input, that is, "jikai no kaigi wa ni juu roku nichi no gozen hachi ji kara kaisai itashi masu", can be acquired. It is easy to convert the text from the reading information into sub-words such as phoneme or syllable. Through this method, the edit result text can be converted into a sub-word string.

Further, in the sub-word conversion unit 31, as another method of converting the edit result text into a sub-word string, a method of storing a keyboard input to the text editor unit 22 by the writing-out operator can be used.

In a general Japanese-language input using a keyboard, as "kana" characters, or reading information, are input and converted into "kanji" characters, the reading information of the edit result text can be obtained by storing the keyboard input. For example, in order to input "nijuurokunichi" in "kanji" characters, when "nijuurokunichi" is input in Roman letters using a keyboard and then converted into "kanji" characters, this reading information obtained from the keyboard input is stored in the edit result storing unit 26. By referring to the reading information acquired from the keyboard input, the sub-word conversion unit 31 can convert the edit result text into a sub-word string.

Although in the second exemplary embodiment the sub-word conversion unit 31 is provided to the matching unit 30, the sub-word conversion unit 31 may be provided to the text conversion unit 22. In that case, the edit result text is converted into a sub-word string at the timing that the text information is edited, and the converted sub-word string is also stored in the edit result storing unit 26. Therefore, the matching unit 30 can collate the edit result text and the recognition result information according to the consistency of sub-words.

Next, effects of the second exemplary embodiment will be described. In the speech-to-text system 2, the matching unit 30 collates the edit result text with the recognition result information according to the consistency of sub-words such as phoneme having higher recognition accuracy than notation characters, even if the speech recognition accuracy of the speech data to be written is low, the edit result text and the speech data can be matched with high accuracy.

Next, the configuration and operation of a speech-to-text system, which is a third exemplary embodiment of the invention, will be described in detail with reference to the drawings.

The speech-to-text system in the third exemplary embodiment is different from the second exemplary embodiment in that the language of speech data to be written is not Japanese but English. The configuration of the speech-to-text system in the third exemplary embodiment is the same as that of FIG. 4.

FIG. 6 shows a specific example of operation of the matching unit in the third exemplary embodiment.

FIG. 6 shows the case that speech data "Can you recommend a hotel which is not too expensive?" is recognized as "Can you wait for men don't tell we give not too expensive?", and this recognition result text is edited correctly. The speech recognition unit 11a outputs a phoneme string of "k ae n y uw w ey t f ax m eh n d ow uw n t t eh l w iy g ih v n aa t t uw jy k s p eh n s iy v" as the recognition result information, in addition to the notation characters. In this process, time information of corresponding speech data is added in the phoneme string. The recognition result storing unit 13 stores the phoneme string with time information, in addition to the notation characters, as the recognition result information.

As the speech recognition unit 11a performs speech recognition processing in phoneme or syllable units as the case of the second exemplary embodiment, the recognition result can be output as a phoneme string.

The sub-word conversion unit 31 converts the edit result text composed of notation characters into a sub-word string. As phoneme is exemplary described as a sub-word in the third exemplary embodiment, the edit result text is converted into a phoneme string. Namely, the edit result text of "Can you recommend a hotel which is not too expensive?" is converted into a phoneme string of "k ae n y uw r eh k ax m eh n d ax hh ow uw t eh l w ih ch ih z n aa t t uw iy k s p eh n s iy v".

As the notation character string in the English language is segmented in word units, the edit result text can easily be converted into a phoneme string by referring to the word dictionary in which phonetic symbols are given.

The sub-word matching unit 32 collates the phoneme string of the edit result text converted by the sub-word conversion unit 31 with the phoneme string of the recognition result information stored in the recognition result storing unit 13. Thereby, as shown in FIG. 6, the edit result text and the speech data can matched with less error. This is because even though "recommend" is incorrectly recognized as "wait for men don't", "r eh k ax m eh n d" is recognized as "w ey t f ax m eh n d . . . " in the phoneme level, so the phoneme is partially correct.

With the correspondence between the edit result text and the recognition result information being acquired by the sub-word matching unit 32, as the recognition result information accompanies time information, the correspondence between the edit result text and the speech data can be acquired.

Next, an effect of the third exemplary embodiment will be described. The speech-to-text system according to the third exemplary embodiment can match the edit result text and the speech data even if the language of the speech data is English. Thereby, even if the speech data to be written-out is in the English language, the operator can use the synchronization function between the edit cursor position and the speech playback time at any time, whereby efficiency of the write-out operation is improved.

Next, the configuration and operation of a computer 3, which is a fourth exemplary embodiment of the invention, will be described in detail with reference to the drawings.

FIG. 9 is a configuration diagram of the computer 3 which is controlled by programs in the case that the first exemplary embodiment, the second exemplary embodiment and the third exemplary embodiment are configured of the programs. Referring to FIG. 9, the computer 3 includes a data processor 50 including an MPU (Micro Processing Unit), a storage device which may be a magnetic disk, a semiconductor memory, or the like, an input/output device 60 including an output device such as a liquid crystal display or a speaker and an input device such as a keyboard or a mouse, and a speech-to-text program 70.

The storage device 40 is used as a speech storing unit 41, a recognition result storing unit 42, an edit position storing unit 43, a speech playback time storing unit 44, an edit result storing unit 45, or the like.

The speech-to-text program 70 is read by the data processor 50, and by controlling the operation of the data processor 50, realizes the functional units in the respective embodiments described above on the data processor 50. In other words, with a control of the speech-to-text program 70, the data processor 50 performs the processes identical to those performed by the speech recognition units 11 and 11a, the speech playback unit 21, the text editor unit 22, the synchronization unit 23, and the matching units 27 and 30.

INDUSTRIAL APPLICABILITY

In a speech-to-text operation for preparing proceedings of meetings or lectures, or in operations such as creating subtitles of movies or TV programs, the present invention can be applied to reduce the burden placed on the operators and to improve the efficiency of the operation.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

BRIEF DESCRIPTION OF THE DRAWINGS

FIG. 6 is an illustration showing a specific example of an operation of the matching unit in FIG. 4.

Figure 1:
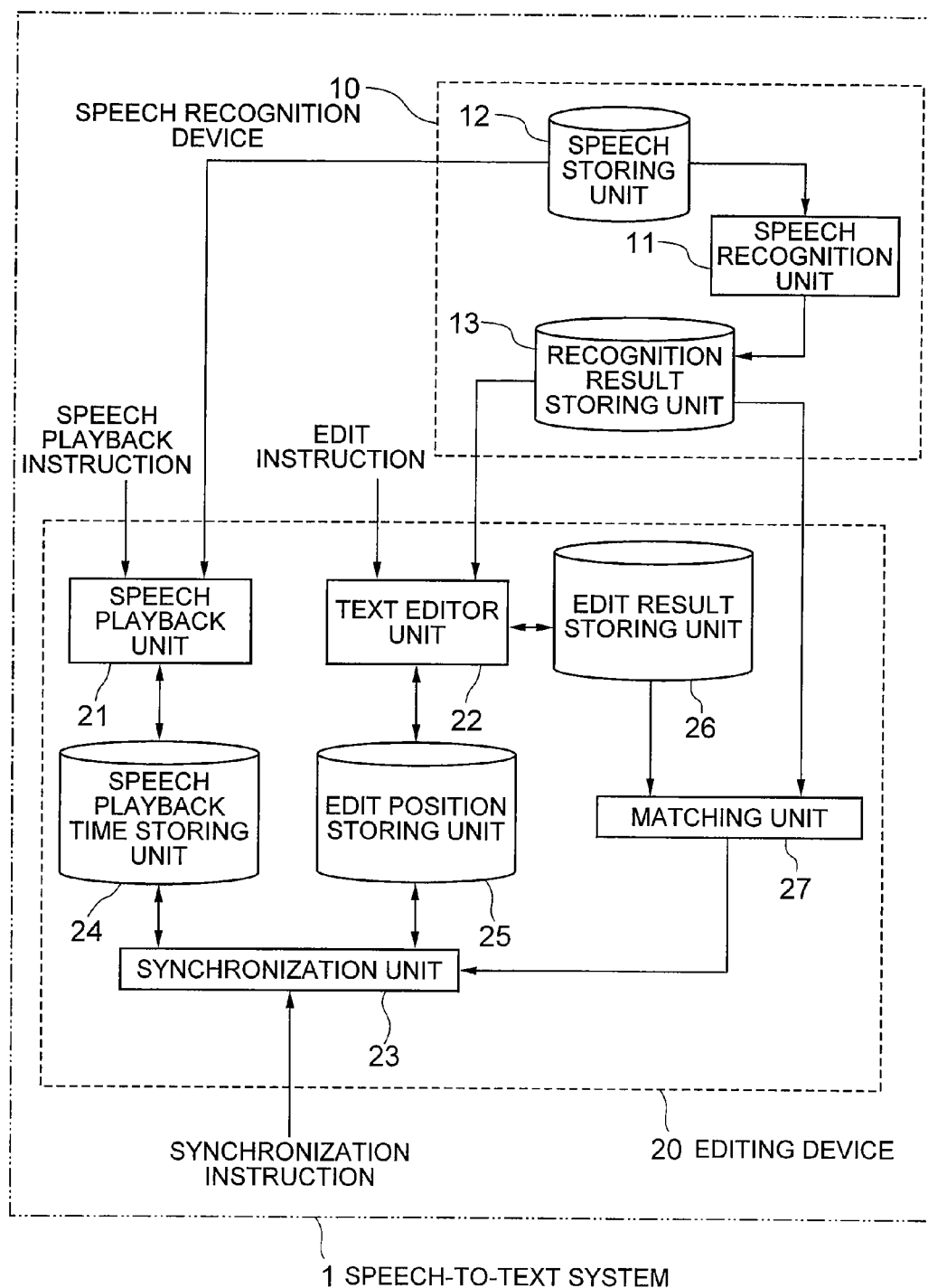
FIG. 1 is a block diagram showing the configuration of a speech-to-text system which is a first exemplary embodiment of the invention.
Figure 2:
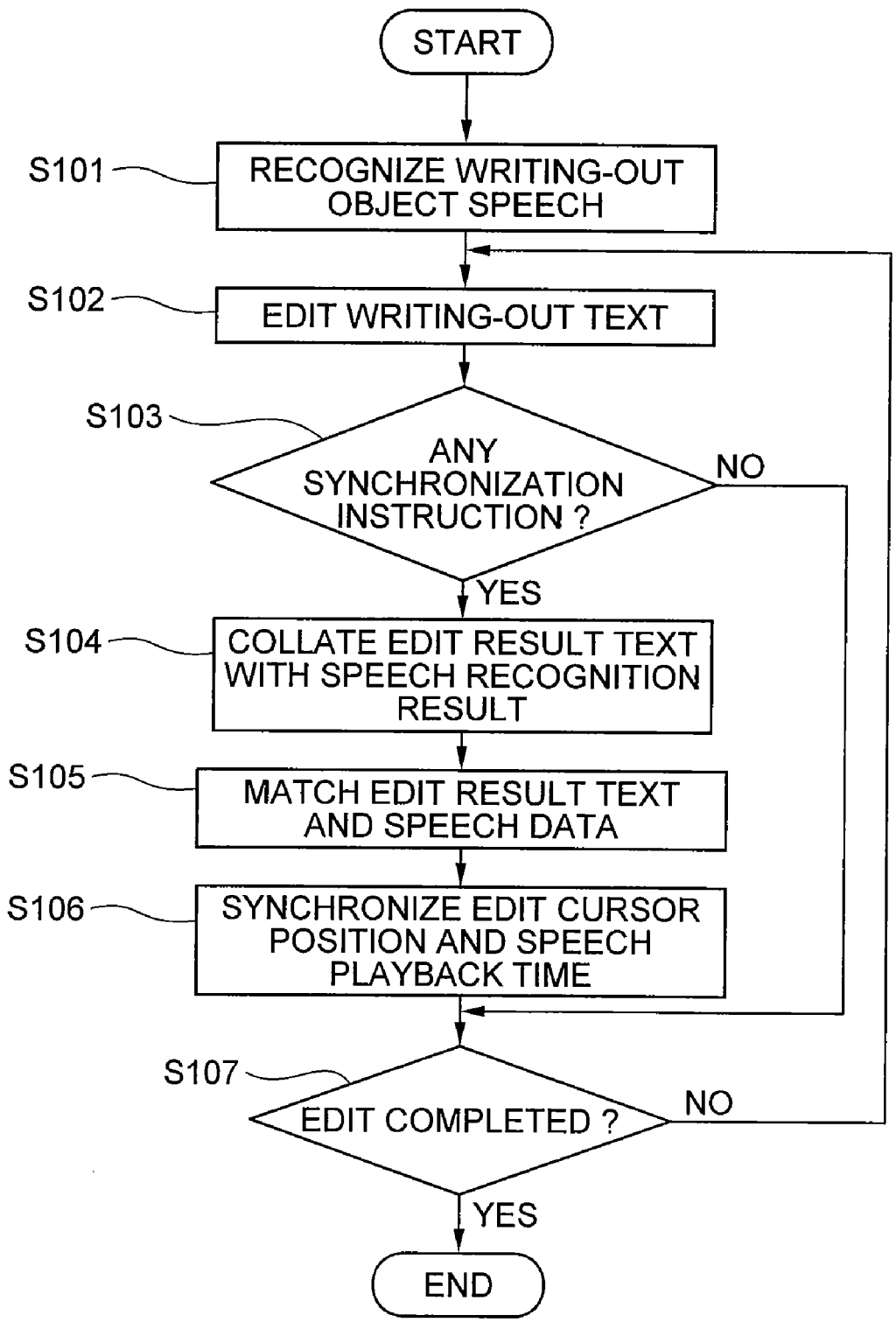
FIG. 2 is a flowchart showing the operation of the speech-to-text system of FIG. 1.
Figure 3:
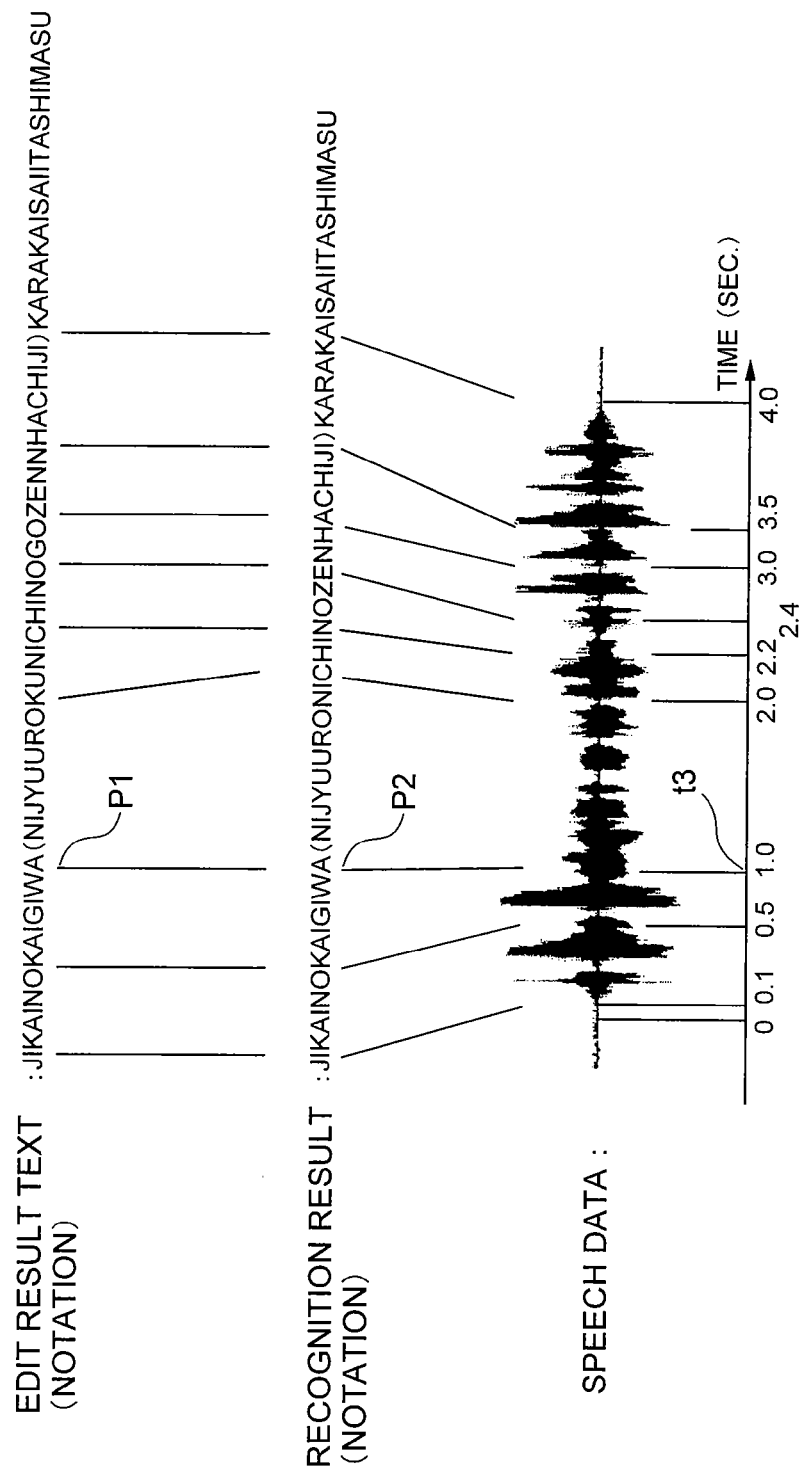
FIG. 3 is an illustration showing a specific example of an operation of the matching unit in FIG. 1.
Figure 4:
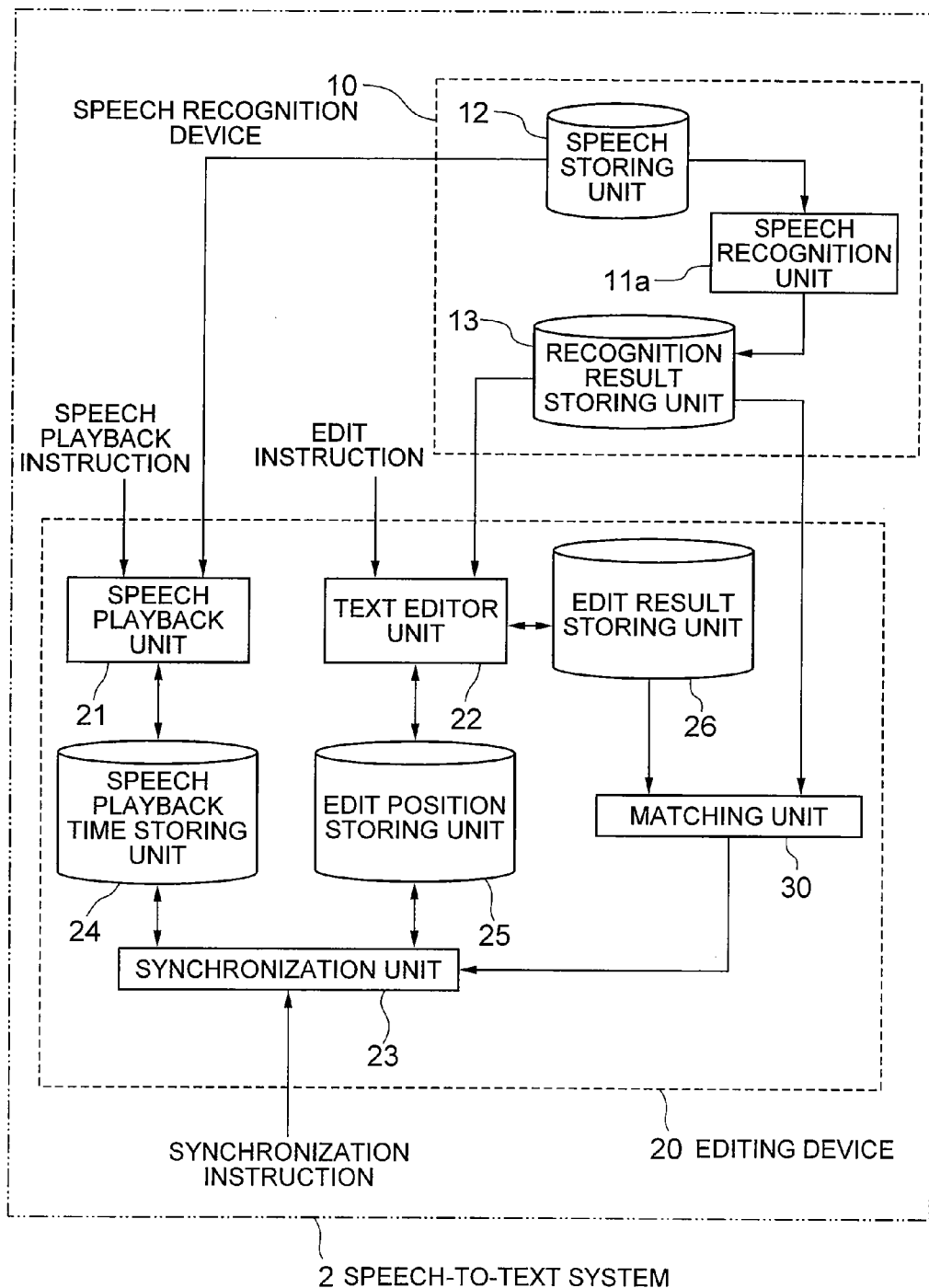
FIG. 4 is a block diagram showing the configuration of the speech-to-text system which is second and third exemplary embodiments of the invention.
Figure 5:
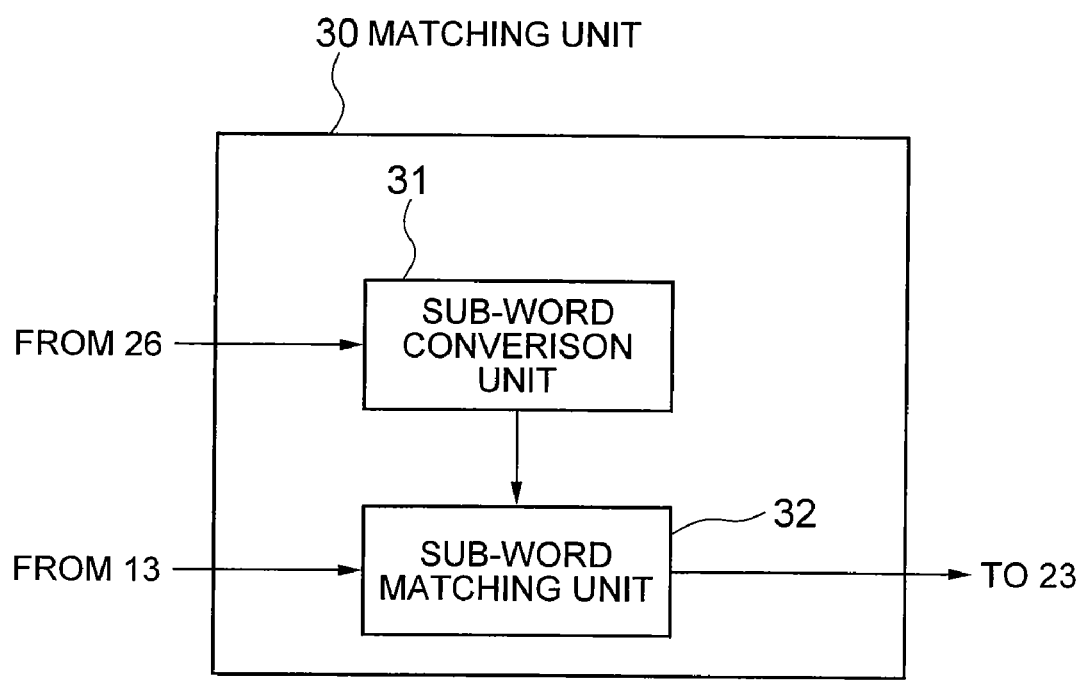
FIG. 5 is a block diagram showing the configuration of the matching unit in FIG. 4.
Figure 7:
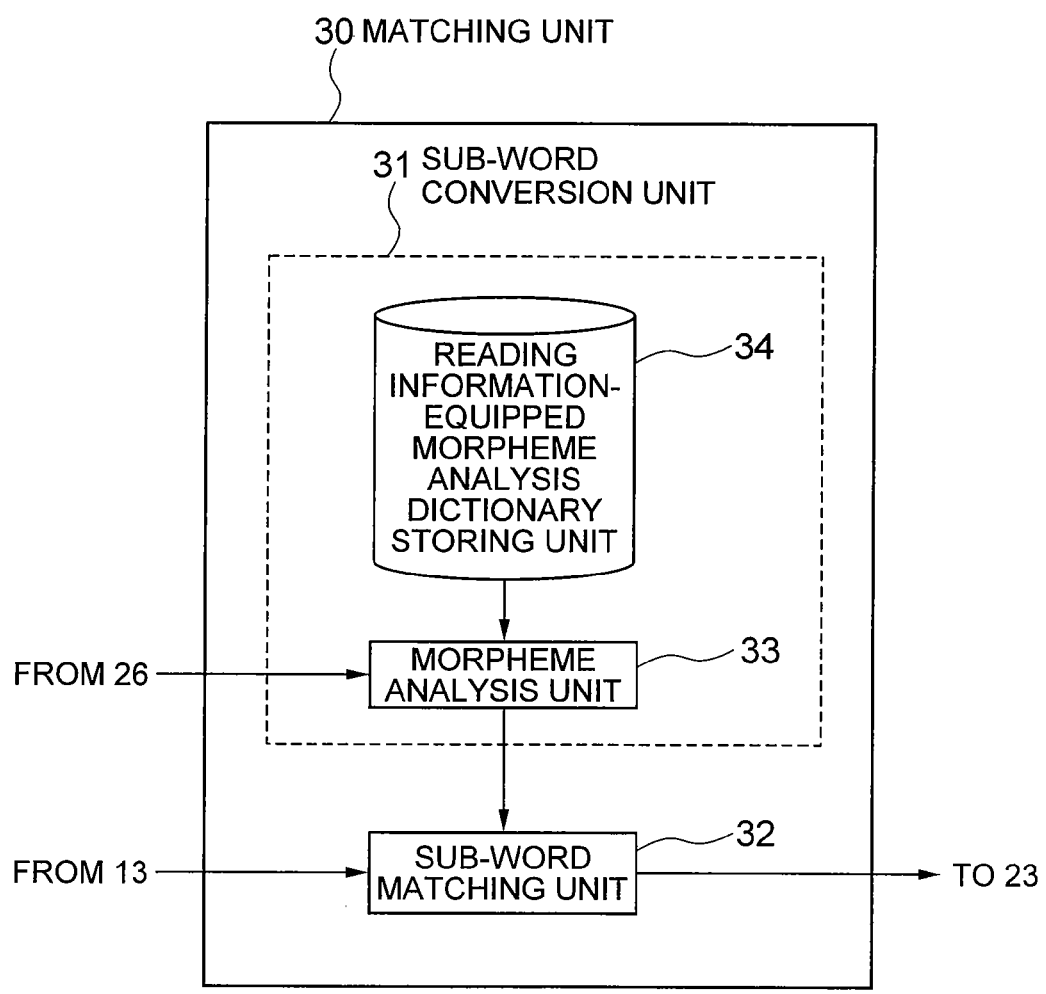
FIG. 7 is a block diagram showing an exemplary configuration of the sub-word conversion unit in FIG. 5.
Figure 8:
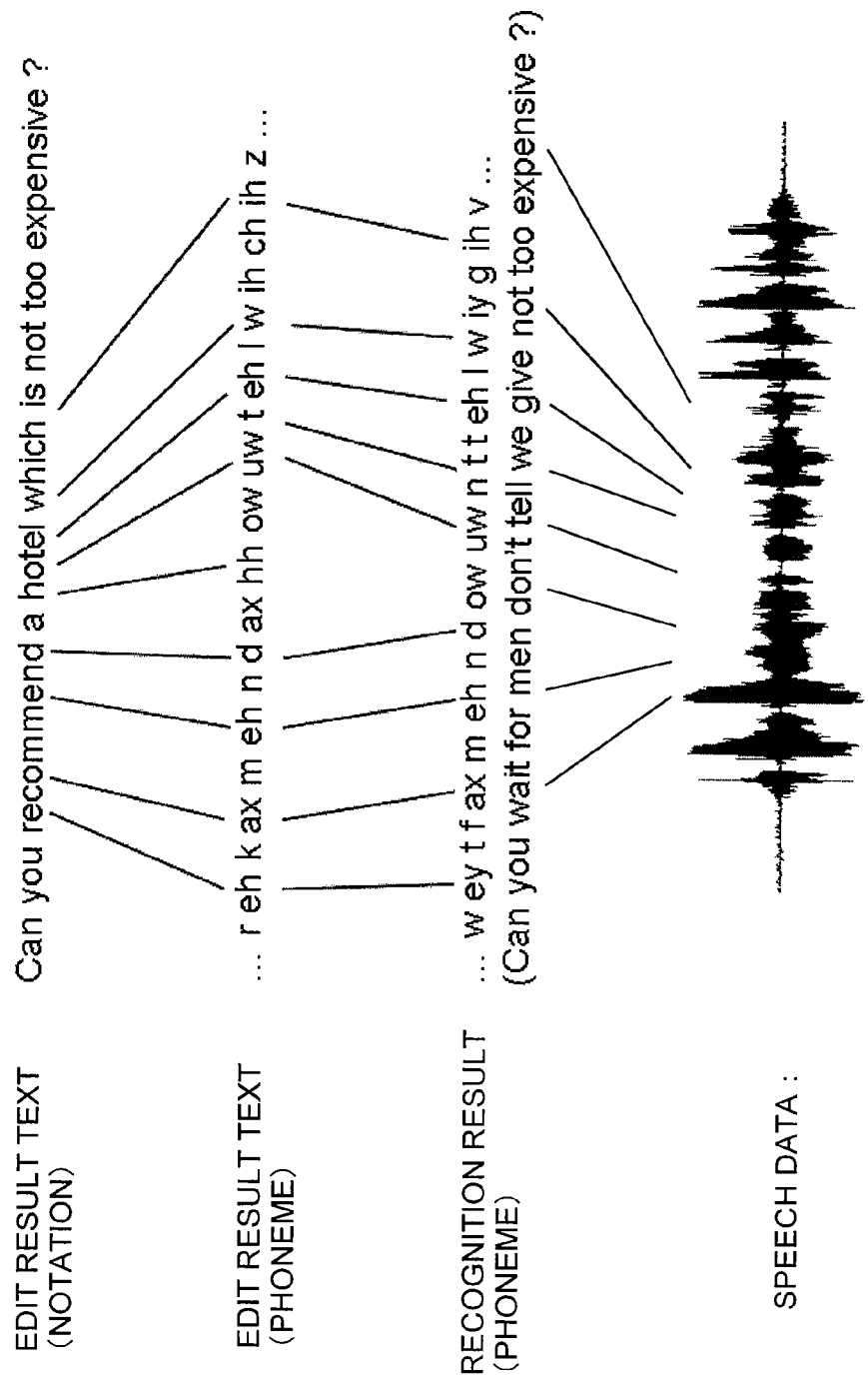
FIG. 8 is an illustration showing a specific example of an operation of the matching unit in the speech-to-text system which is the third exemplary embodiment of the invention.
Figure 9:
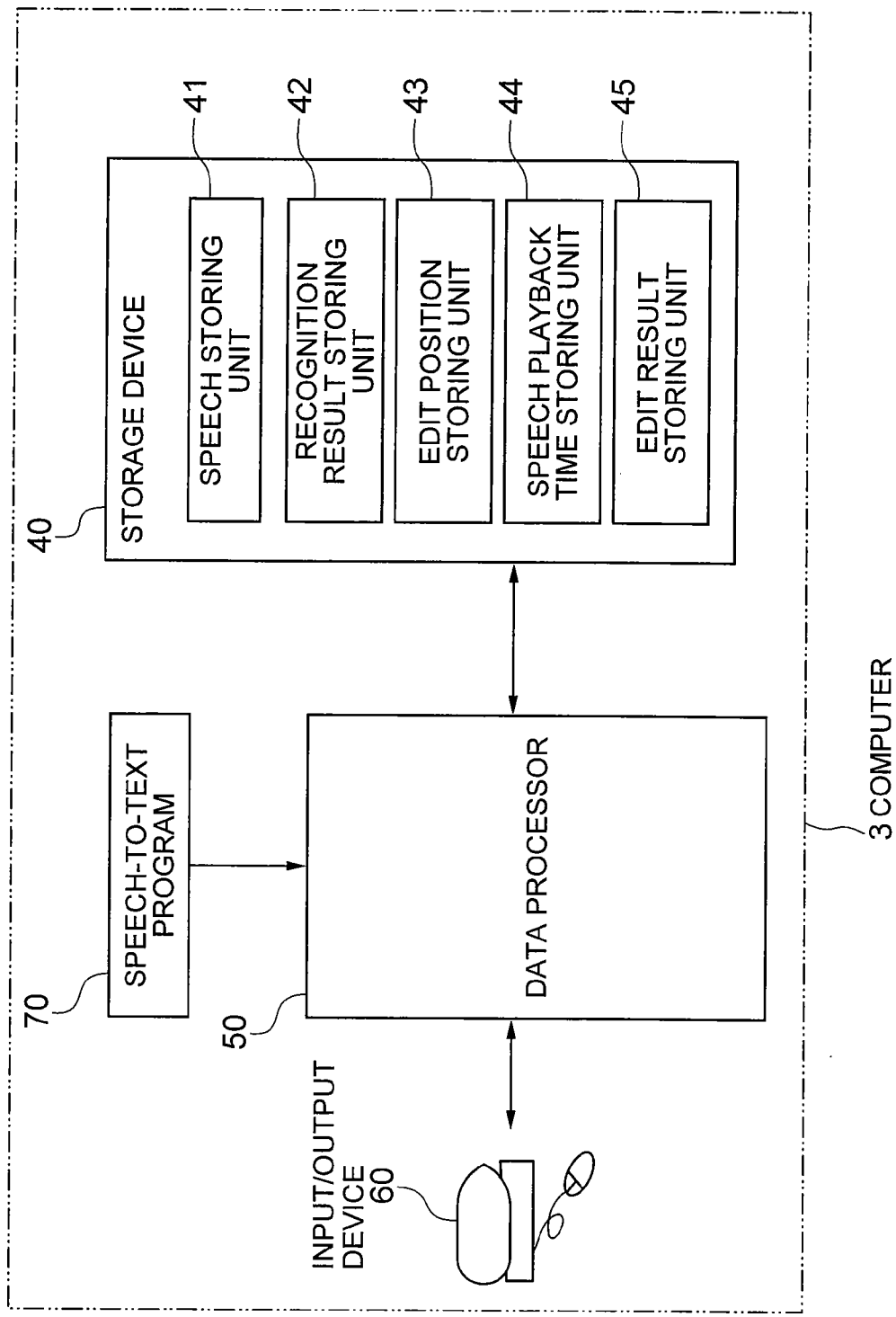
FIG. 9 is a block diagram showing the configuration of a computer which is a fourth exemplary embodiment of the invention.
Figure 10:
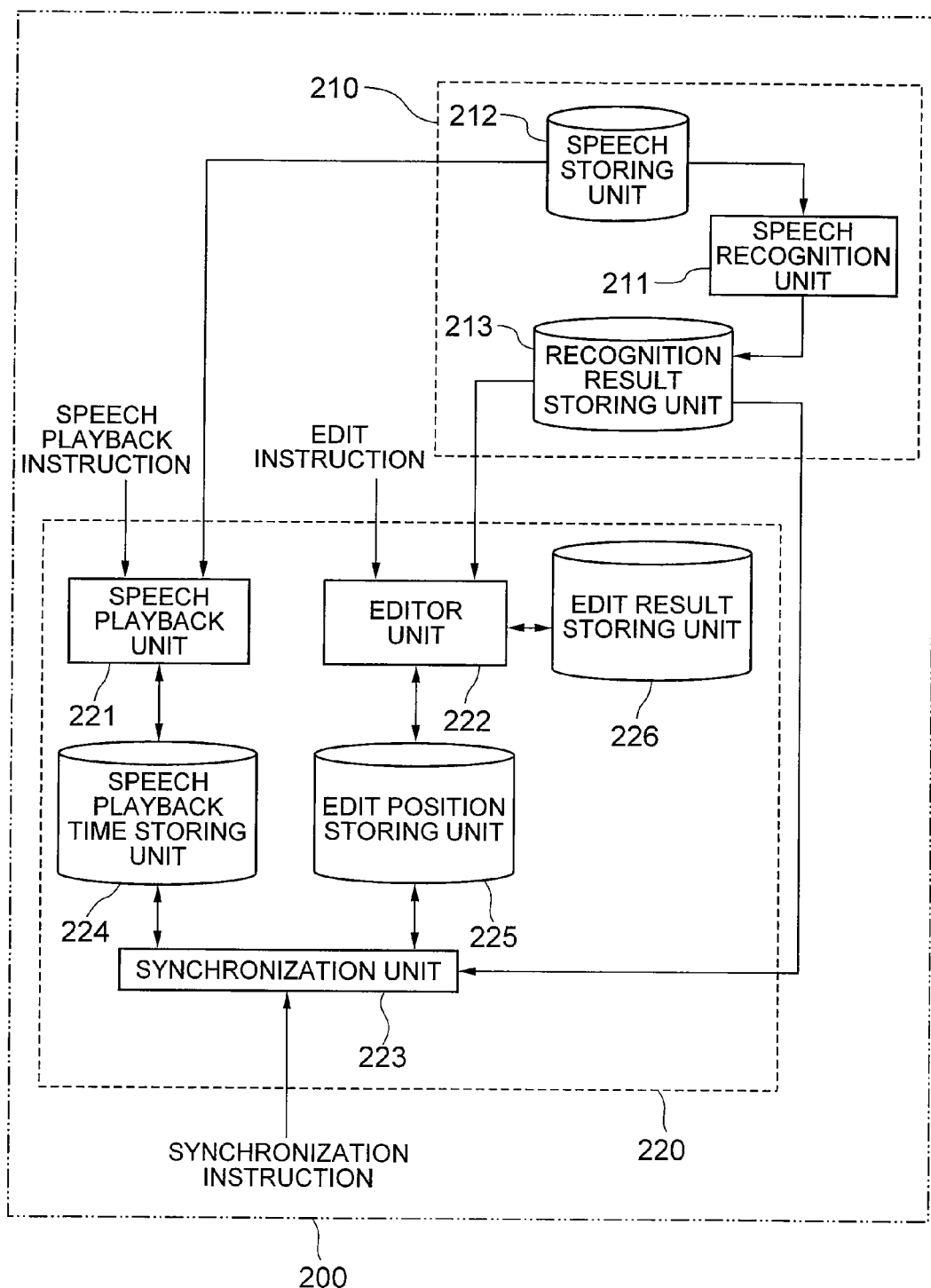
FIG. 10 is a block diagram showing the configuration of a conventional speech-to-text system.

DESCRIPTION OF REFERENCE NUMERALS 1,2 speech-to-text system
3 computer
10 speech recognition device
11,11a speech recognition unit
12 speech storing unit
13 recognition result storing unit
20 editing device
21 speech playback unit
22 text editor unit
23 synchronization unit
24 speech playback time storing unit
25 edit position storing unit
26 edit result storing unit
27,30 matching unit
31 sub-word conversion unit
32 sub-word matching unit
33 morpheme analysis unit
34 reading information-equipped morpheme analysis dictionary storing unit
40 storage device 41 speech storing unit
42 recognition result storing unit
43 edit position storing unit
44 speech playback time storing unit
45 edit result storing unit
50 data processor
60 input/output device
70 speech-to-text program
200 speech-to-text system
210 speech recognition device
211 speech recognition unit
212 speech storing unit
213 recognition result storing unit
220 editing device
221 speech playback unit
222 editor unit
223 synchronization unit
224 speech playback time storing unit
225 edit position storing unit
226 edit result storing unit

What is claimed is:

1. A speech-to-text system comprising:
a speech recognition unit which performs speech recognition of speech data and outputs a recognition result sub-word string as a sub-word string including time information based on a playback time of the speech data;
a text editor unit which creates edit result text which is text information written-out from the speech data;
a sub-word conversion unit which converts the edit result text into an edit result sub-word string; and
a matching unit which adds the time information to an edited part in the edit result text by collating the edit result sub-word string with the recognition result sub-word string to which the time information has been added according to consistency of sub-words to thereby match the edit result text and the speech data.

2. The speech-to-text system, according to claim 1, wherein the sub-word conversion unit converts the edit result text into a sub-word string by morpheme analysis using a dictionary having reading information.

3. The speech-to-text system, according to claim 1, wherein
the text editor unit stores a "kana" character string input before "kana-to-kanji" conversion, and
the sub-word conversion unit converts the edit result text into a sub-word string by referring to the "kana" character string before "kana-to-kanji" conversion.

4. The speech-to-text system, according to claim 1, including:
a speech playback unit which plays back the speech data; and
a synchronization unit which synchronizes an edit cursor position of the text editor unit with speech playback time of the speech playback unit by referring to correspondence between the edit result text and the speech data made by the matching unit.

5. The speech-to-text system, according to claim 4, wherein the synchronization unit synchronizes the edit cursor position with the speech playback time.

6. The speech-to-text system, according to claim 4, wherein the synchronization unit synchronizes the speech playback time with the edit cursor position.

7. A speech-to-text method comprising:
performing speech recognition of speech data and outputting a recognition result sub-word string as a sub-word string including time information based on a playback time of the speech data;
creating edit result text which is text information written-out from the speech data;
converting the edit result text into an edit result sub-word string; and
adding the time information to an edited part in the edit result text by collating the edit result sub-word string with the recognition result sub-word string to which the time information has been added according to consistency of sub-words to thereby match the edit result text and the speech data.

8. The speech-to-text method, according to claim 7, wherein in converting the edit result text into a sub-word string, the edit result text is converted into a sub-word string by morpheme analysis using a dictionary having reading information.

9. The speech-to-text system method, according to claim 7, wherein
in creating edit result text, storing a "kana" character string input before "kana-to-kanji" conversion, and
in converting the edit result text into a sub-word string, converting the edit result text into a sub-word string by referring to the "kana" character string before "kana-to-kanji" conversion.

10. The speech-to-text method, according to claim 7, comprising:
playing back the speech data; and
synchronizing an edit cursor position with speech playback time by referring to correspondence between the edit result text and the speech data.

11. The speech-to-text method, according to claim 10, wherein the edit cursor position is synchronized with the speech playback time.

12. The speech-to-text method, according to claim 10, n the synchronization step, synchronizing the speech playback time is synchronized with the edit cursor position.

13. A non-transitory computer-readable medium containing a speech-to-text program for causing a computer to execute:
a speech recognition process for performing speech recognition of speech data and outputting a recognition result sub-word string as a sub-word string including time information based on a playback time of the speech data;
a text editing process for creating edit result text which is text information written-out from the speech data;
a sub-word conversion process for converting the edit result text into an edit result sub-word string; and
a matching process for adding the time information to an edited part in the edit result text by collating the edit result sub-word string with the recognition result sub-word string to which the time information has been added according to consistency of sub-words to thereby match the edit result text and the speech data.

14. The non-transitory computer-readable medium containing a speech-to-text program, according to claim 13, wherein in the sub-word conversion process, the program causes the computer to execute a process of converting the edit result text into a sub-word string by morpheme analysis using a dictionary having reading information.

15. The non-transitory computer-readable medium containing a speech-to-text program, according to claim 13, wherein
in the text editing process, a "kana" character string input before "kana-to-kanji" conversion is stored, and
in the sub-word conversion process, the program causes the computer to execute a process of converting the edit result text into a sub-word string by referring to the "kana" character string before "kana-to-kanji" conversion.

16. The non-transitory computer-readable medium containing a speech-to-text program, according to claim 13, causing the computer to execute:
a speech playback process for playing back the speech data; and
a synchronization process for synchronizing an edit cursor position in the text editing process with speech playback time in the speech playback process by referring to correspondence between the edit result text and the speech data made in the matching process.

17. The non-transitory computer-readable medium containing a speech-to-text program, according to claim 16, wherein in the synchronization process, the program causes the computer to execute a process of synchronizing the edit cursor position with the speech playback time.

18. The non-transitory computer-readable medium containing a speech-to-text program, according to claim 16, wherein in the synchronization process, the program causes the computer to execute a process of synchronizing the speech playback time with the edit cursor position.

19. A speech-to-text system comprising:
a speech recognition means for performing speech recognition of speech data and outputting a recognition result sub-word string as a sub-word string including time information based on a playback time of the speech data;
a text editor means for creating edit result text which is text information written-out from the speech data;
a sub-word conversion means for converting the edit result text into an edit result sub-word string; and
a matching means for adding the time information to an edited part in the edit result text by collating the edit result sub-word string with the recognition result sub-word string to which the time information has been added according to consistency of sub-words to thereby match the edit result text and the speech data.

* * * * *